F. E. SCHWENTLER.
INDEPENDENT CLASP BRAKE FOR TRAILER TRUCKS.
APPLICATION FILED NOV. 11, 1914.
1,270,878.
Patented July 2, 1918.
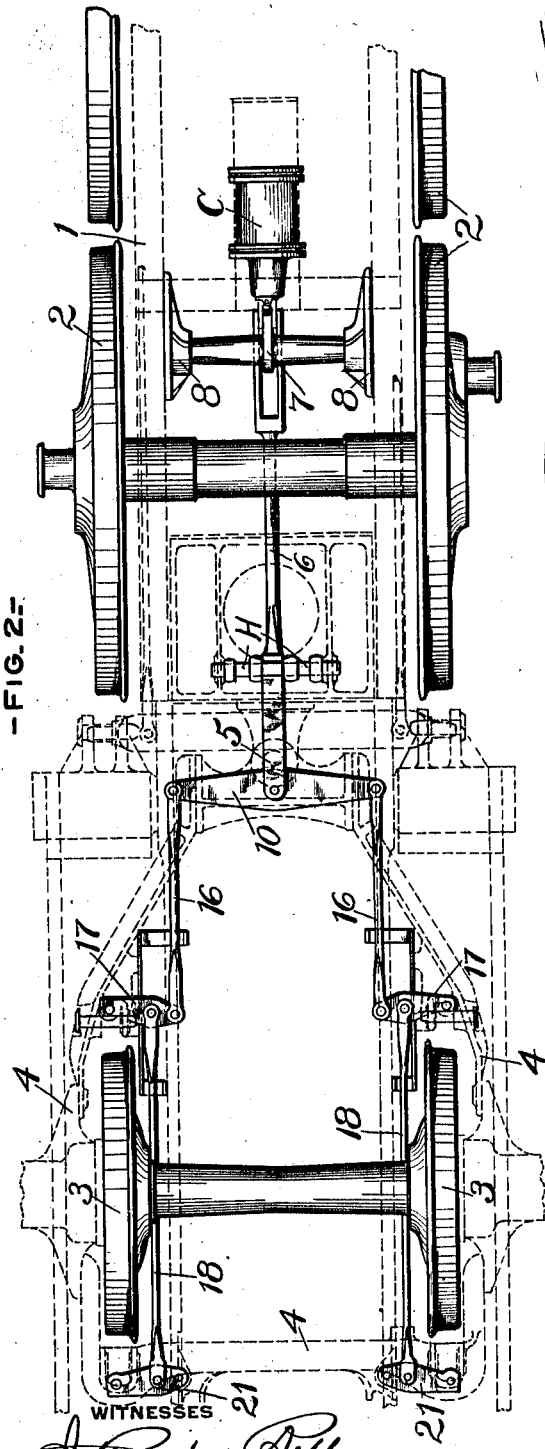
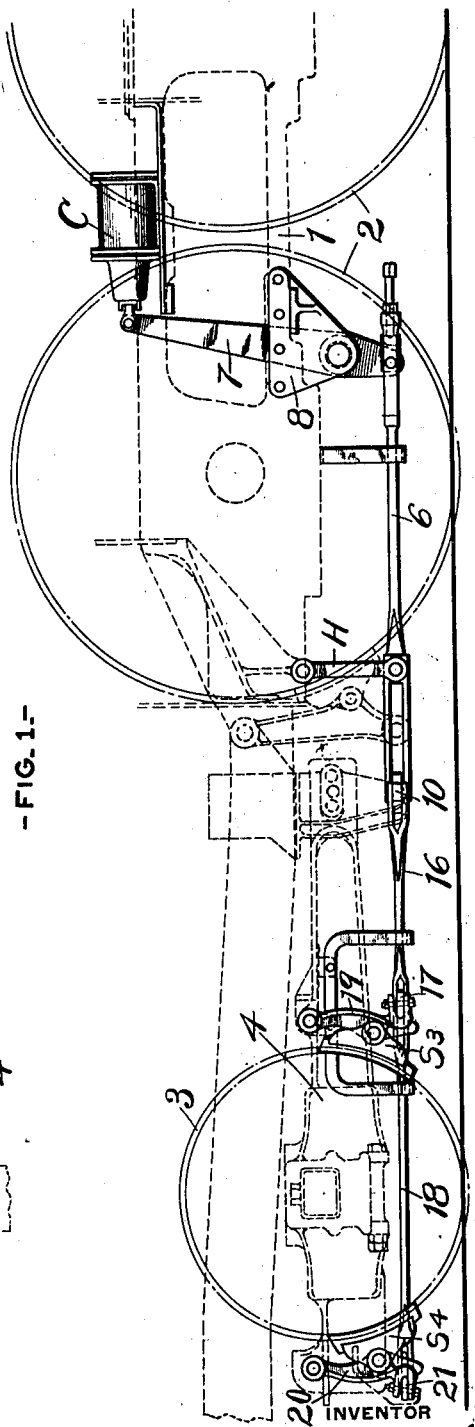

UNITED STATES PATENT OFFICE.

FRANCIS E. SCHWENTLER, OF ST. LOUIS, MISSOURI, ASSIGNOR TO THE AMERICAN BRAKE COMPANY, OF ST. LOUIS, MISSOURI, A CORPORATION OF MISSOURI.

INDEPENDENT CLASP-BRAKE FOR TRAILER-TRUCKS.

1,270,878.

Specification of Letters Patent.  Patented July 2, 1918.

Application filed November 11, 1914. Serial No. 871,437.

*To all whom it may concern:*

Be it known that I, FRANCIS E. SCHWENTLER, a citizen of the United States, and a resident of St. Louis, in the State of Missouri, have invented a certain new and useful Improvement in Independent Clasp-Brakes for Trailer-Trucks, of which improvement the following is a specification.

This invention relates to brake rigging for locomotives having radial trailer trucks, and has for its object to provide a self-contained clasp type of brake for the trailer truck wheels, and operated by an independent brake cylinder, whereby the full equalized pressure for the brakes on the trailer truck may be readily obtained at all times without the use of mechanical connections, with the equalized system of driver brakes. The construction is thus very much simplified and may be readily applied to the various designs of trailer truck locomotives without interfering with the members of the engine frame.

In the accompanying drawings: Figure 1 is a side elevation of a brake design embodying my improvement as applied to the radial trailer truck of a locomotive, the main and trailer truck frames being indicated in dotted lines; and Fig. 2, a plan of same.

According to the construction shown in the drawings, my improvement is illustrated in connection with the usual form of trailer truck locomotive having a main frame, 1, with driving wheels, 2, a radial trailer truck frame, 4, pivoted at 5 to the main frame, and carrying journal boxes for the trailer truck wheels, 3. The usual form of equalized driver brake system may be employed for applying the brakes to the driving wheels.

For actuating the brakes on the trailer truck, brake heads and shoes, S³ and S⁴, are applied to both sides of the trailing wheels, being pivotally supported on the respective jaw hanger levers, 19 and 20, pivoted on suitable brackets carried by the trailer truck frame. The lower ends of the hangers are pivotally connected to the respective short levers, 17 and 21, which are connected together by pull rods, 18, upon both sides of the trailer truck.

According to the design shown in Figs. 1 and 2, the equalizing truck levers, 17 and 21 are attached at their outside ends to the hanger levers, while the pull rods, 18, are located upon the inner side of the trailing wheels. The inner ends of said levers, 21, are pivoted on fixed fulcrums mounted on the frame 4, but the levers, 17, are actuated by rods, 16, connected to opposite ends of a cross equalizer, 10, which may be supported in suitable guides on the trailer truck frame, and actuated by main rod, 6, connected to the lower arm of the vertical brake cylinder lever, 7. This lever is pivotally mounted on brackets, 8, supported on the main engine frame, and is connected at its upper end to the piston of the brake cylinder, C, also mounted on the main frame. The jaw end of the main pull rod, 6, is preferably guided by means of the triangular hanger, H, pivotally connected at the lower end to the rod, 6, and comprising upwardly and laterally diverging bars pivotally attached to the main frame at suitable points separated from each other a sufficient distance to prevent the hanger from swinging laterally. This serves to guide the middle pin of the equalizer, 10, which should be located and maintained as nearly as practicable coincident with the truck center pin, 5, and restrains the equalizer, 10, against lateral movement when the brakes are set while the locomotive is passing around curves. This also maintains the proper alinement of rods, 16, and prevents the same from striking against the ash pan or other parts of the locomotive.

This construction comprises a self-contained clasp brake arrangement for the trailer truck wheels and operated by an additional brake cylinder separate from the usual brake cylinder of the equalizer driver brake rigging. In this way all complicated mechanical connections between the brake levers of the driver brake system and those of the trailer truck are dispensed with and the design may be readily applied to any of the various forms of trailer truck locomotives.

Having now described my invention, what I claim as new and desire to secure by Letters Patent is:

1. In a brake rigging for locomotives with trailer trucks, the combination with the main frame and the trailer truck frame, of brake shoes applied to both sides of the trailer truck wheels, two sets of truck levers and pull rod connections, one on each side of the truck, for actuating said brake shoes, a cross equalizer located substantially at the pivot of the trailer truck frame and having pull rod connections with the truck levers, and a brake cylinder mounted on the main frame and having connections for actuating said cross equalizer.

2. In a brake rigging for locomotives with trailer trucks, the combination with the main frame, and the trailer truck frame, of brake shoes applied to both sides of the trailer truck wheels, two sets of truck levers and pull rod connections, one on each side of the truck, for actuating said brake shoes, a cross equalizer located substantially at the pivot of the trailer truck frame and having pull rod connections with the truck levers, means for restraining said equalizer against lateral movement, and a brake cylinder mounted on the main frame and having connections for actuating said cross equalizer.

3. In a brake rigging for locomotives with trailer trucks, the combination with the main frame, and the trailer truck frame, of brake shoes applied to both sides of the trailer truck wheels, two sets of equalizer truck levers and pull rods, one on each side of the truck, for actuating said brake shoes, a cross equalizer having pull rod connections with one pair of truck levers, the other pair of truck levers having fixed fulcrums, a main pull rod connected to said cross equalizer, and a guide mounted on the main frame for preventing lateral movement of said main pull rod.

4. In a brake rigging for locomotives with trailer trucks, the combination with the main frame, and the trailer truck frame, of brake shoes applied to both sides of the trailer truck wheels, two sets of equalizer truck levers and pull rods, one on each side of the truck, for actuating said brake shoes, a cross equalizer having pull rod connections with one pair of truck levers, the other pair of truck levers having fixed fulcrums, a main pull rod connected to said cross equalizer, and a triangular guide hanger mounted on the main frame and pivotally connected to said main pull rod.

FRANCIS E. SCHWENTLER.

Witnesses:
F. G. GUILFOYL,
OTTO J. PAPKE.